US005579435A

United States Patent [19]

Jansson

[11] Patent Number: 5,579,435

[45] Date of Patent: Nov. 26, 1996

[54] DISCRIMINATING BETWEEN STATIONARY AND NON-STATIONARY SIGNALS

[75] Inventor: Klas F. J. Jansson, Sundbyberg, Sweden

[73] Assignee: Telefonaktiebolaget LM Ericsson, Stockholm, Sweden

[21] Appl. No.: 332,740

[22] Filed: Nov. 1, 1994

[30] Foreign Application Priority Data

Nov. 2, 1993 [SE] Sweden .................................. 9303613

[51] Int. Cl.[6] .................................. G01L 3/00; G01L 3/02

[52] U.S. Cl. ........................ 395/2.42; 395/2.37; 395/2.55; 395/2.17; 381/56; 455/63

[58] Field of Search .................................. 395/2.37, 2.55, 395/2.42, 2.17; 381/56, 68; 455/63

[56] References Cited

U.S. PATENT DOCUMENTS

| | | | |
|---|---|---|---|
| 4,185,168 | 1/1980 | Graupe et al. | 381/68 |
| 4,544,919 | 10/1985 | Gerson | 341/75 |
| 4,764,966 | 8/1988 | Einkauf et al. | 395/2.37 |
| 5,485,522 | 1/1996 | Solve et al. | 381/56 |

FOREIGN PATENT DOCUMENTS

| | | |
|---|---|---|
| 335521 | 10/1989 | European Pat. Off. . |
| 522213 | 1/1993 | European Pat. Off. . |
| 566131 | 10/1993 | European Pat. Off. . |
| 2137791 | 10/1984 | United Kingdom . |

OTHER PUBLICATIONS

"Voice Activity Detection", *GSM–Recommendation 06.32*, Jan. 1991, pp. 5–37 (odd only).

Adoul et al., "A Comparison of Some Algebraic Structures for CELP Coding of Speech", *Proc. International Conference on Acoustics, Speech and Signal processing*, 1987, pp. 1953–1956.

Campbell et al., "The DOD 4.8 KBPS Standard (Proposed Federal Standard 1016)", *Kluwer Academic Publishers*, 1991, pp. 121–134.

Salami, "Binary Pulse Excitation: A Novel Approcach to Low Complexity CELP Coding", *Kluwer Academic Publishers*, 1991, pp. 145–156.

Atal et al., "Advances in Speech Coding", *Kluwer Academic Publishers*, 1991, pp. 69–79.

Strobach, "New Forms of Levinson and Schur Algorithms", *IEEE SP Magazine*, Jan. 1991, pp. 12–36.

LeRoux et al., "A Fixed Point Computation of Partial Correlation Coefficients", vol. ASSP–26, No. 3, 1977, pp. 257–259.

Rabiner et al., "Digital Processing of Speech Signals", Chapter 8, Prentice–Hall, 1978 pp. 396–461.

*Primary Examiner*—Allen R. MacDonald

*Assistant Examiner*—Tālivaldis I. Šmits

*Attorney, Agent, or Firm*—Burns, Doane, Swecker & Mathis, L.L.P.

[57] ABSTRACT

Signal frames containing background sounds in a mobile radio communication system are tested for stationarity. Consecutive measures $\Delta E_n$ representing spectral changes in said signals from frame to frame are formed. From these measures a second measure of the rate of spectral change are formed. Finally, it is determined whether this second measure exceeds a predetermined stationarity limit $\gamma$. If this is the case the signals are considered stationary.

12 Claims, 3 Drawing Sheets

DISCRIMINATING BETWEEN STATIONARY AND NON-STATIONARY SIGNALS

TECHNICAL FIELD

The present invention relates to a method and apparatus for discriminating between stationary and non-stationary signals. This method and apparatus are used to detect whether a signal frame representing background sounds in a mobile radio communication system is stationary.

BACKGROUND OF THE INVENTION

Many modern speech coders belong to a large class of speech coders known as LPC (Linear Predictive Coders). Examples of coders belonging to this class are: the 4,8 Kbit/s CELP from the U.S. Department of Defense, the RPE-LTP coder of the European digital cellular mobile telephone system GSM, the VSELP coder of the corresponding American system ADC, as well as the VSELP coder of the pacific digital cellular system PDC.

These coders all utilize a source-filter concept in the signal generation process. The filter is used to model the short-time spectrum of the signal that is to be reproduced, whereas the source is assumed to handle all other signal variations.

A common feature of these source-filter models is that the signal to be reproduced is represented by parameters defining the output signal of the source and filter parameters defining the filter. The term "linear predictive" refers to the method generally used for estimating the filter parameters. Thus, the signal to be reproduced is partially represented by a set of filter parameters.

The method of utilizing a source-filter combination as a signal model has proven to work relatively well for speech signals. However, when the user of a mobile telephone is silent and the input signal comprises the surrounding sounds, the presently known coders have difficulties in coping with this situation, since they are optimized for speech signals. A listener on the other side of the communication link may easily get annoyed when familiar background sounds cannot be recognized since they have been "mistreated" by the coder.

According to swedish patent application 93 00290-5, which is hereby incorporated by reference, this problem is solved by detecting the presence of background sounds in the signal received by the coder and modifying the calculation of the filter parameters in accordance with a certain so called anti-swirling algorithm if the signal is dominated by background sounds.

However, it has been found that different background sounds may not have the same statistical character. One type of background sound, such as car noise, can be characterized as stationary. Another type, such as background babble, can be characterized as being non-stationary. Experiments have shown that the mentioned anti-swirling algorithm works well for stationary but not for non-stationary background sounds. Therefore it would be desirable to discriminate between stationary and non-stationary background sounds, so that the anti-swirling algorithm can be by-passed if the background sound is non-stationary.

Swedish patent application 93 01798-6, which is hereby incorporated by reference, describes a discriminator capable of discriminating between stationary and non-stationary signal frames representing background sounds. However, this discriminator uses a significant amount of signal processor memory, which is a scarce resource. In one embodiment the memory requirements have been reduced, but this embodiment is sub-optimal.

SUMMARY OF THE INVENTION

Thus, an object of the present invention is an efficient method and apparatus for discriminating between stationary and non-stationary signal frames representing background sounds in a mobile radio communication system.

In accordance with the present invention such a method comprises the steps of:

(a) forming a set of first consecutive measures representing spectral changes in said signals from frame to frame;
(b) forming a second measure of the rate of spectral change of said signals from said first measures; and
(c) determining whether said second measure exceeds a predetermined stationarity limit $\gamma$.

According to the present invention the apparatus comprises:

(a) means for forming a set of first consecutive measures representing spectral changes in said signals from frame to frame;
(b) means for forming a second measure of the rate of spectral change of said signals from said first measures and
(c) means for determining whether said second measure exceeds a predetermined stationarity limit $\gamma$.

BRIEF DESCRIPTION OF THE DRAWINGS

The present invention, together with further objects and advantages thereof, may best be understood by making reference to the following description taken together with the accompanying drawings, in which.

DETAILED DESCRIPTION OF THE PREFERRED EMBODIMENTS

Figure 1:
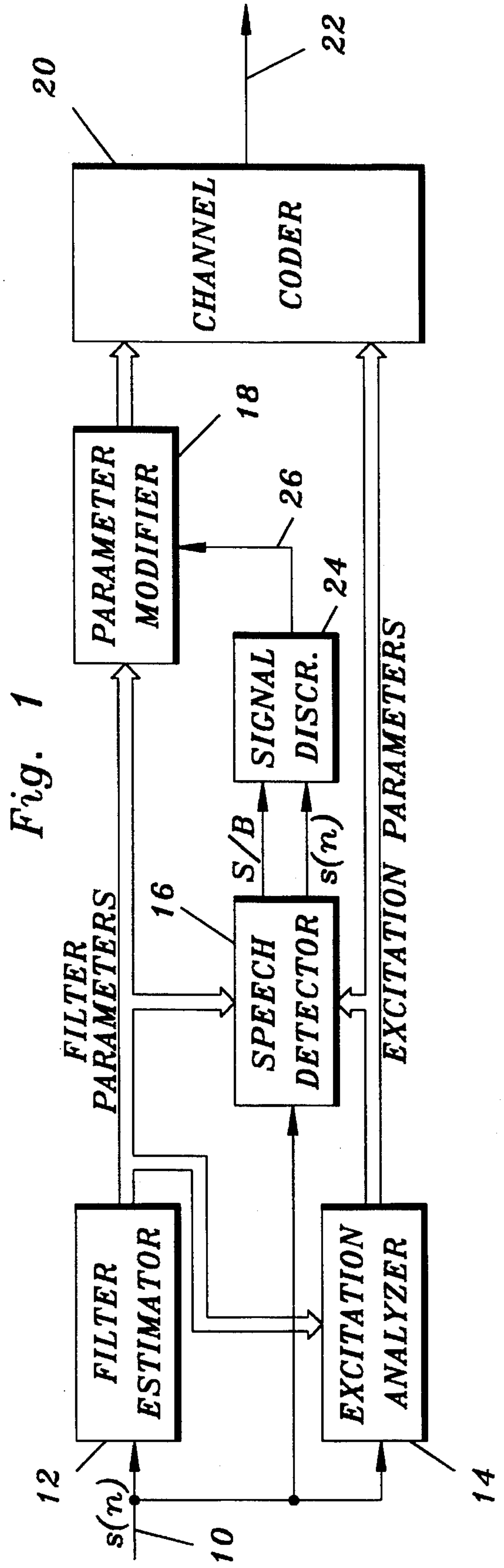
FIG. 1 is a block diagram of a speech encoder provided with means for performing the method in accordance with the present invention.

Referring to the speech encoder of FIG. 1, on an input line 10 an input signal s(n) is forwarded to a filter estimator 12, which estimates the filter parameters in accordance with standard procedures (Levinson-Durbin algorithm, the Burg algorithm, Cholesky decomposition (Rabiner, Schafer: "Digital Processing of Speech Signals", Chapter 8, Prentice-Hall, 1978), the Schur algorithm (Strobach: "New Forms of Levinson and Schur Algorithms", IEEE SP Magazine, January 1991, pp 12–36), the Le Roux-Gueguen algorithm (Le Roux, Gueguen: "A Fixed Point Computation of Partial Correlation Coefficients", "IEEE Transactions of Acoustics, Speech and Signal Processing", Vol ASSP-26, No 3, pp 257–259, 1977), the so called FLAT-algorithm (described in U.S. Pat. No. 4,544,919 assigned to Motorola Inc.). Filter estimator 12 outputs the filter parameters for each frame. These filter parameters are forwarded to an excitation analyzer 14, which also receives the input signal on line 10. Excitation analyzer 14 determines the best source or excitation parameters in accordance with standard procedures. Examples of such procedures are VSELP (Gerson, Jasiuk: "Vector Sum Excited Linear Prediction (VSELP)", in Atal et al, eds, "Advances in Speech Coding", Kluwer Academic Publishers, 1991, pp 69–79), TBPE (Salami, "Binary Pulse Excitation: A Novel Approach to Low Complexity CELP Coding", pp 145–156 of previous reference), Stochastic Code Book (Campbell et al: "The DoD 4.8 KBPS Standard (Proposed Federal Standard 1016)", pp 121–134 of previous reference), ACELP (Adoul, Lamblin: "A Comparison of Some Algebraic Structures for CELP Coding of Speech", Proc. International Conference on Acoustics, Speech and Signal Processing 1987, pp 1953–1956). These excitation parameters, the filter parameters and the input signal on line 10 are forwarded to a speech detector 16. This detector 16 determines whether the input signal comprises primarily speech or background sounds. A possible detector is for instance the voice activity detector defined in the GSM system (Voice Activity Detection, GSM-recommendation 06.32, ETSI/PT 12). A suitable detector is described in EP,A,335 521 (BRITISH TELECOM PLC). The speech detector 16 produces an output signal S/B indicating whether the coder input signal contains primarily speech or not. This output signal together with the filter parameters is forwarded to a parameter modifier 18 over a signal discriminator 24.

In accordance with swedish patent application 9300290-5, the parameter modifier 18 modifies the determined filter parameters in the case where there is no speech signal present in the input signal to the encoder. If a speech signal is present the filter parameters pass through the parameter modifier 18 without change. The possibly changed filter parameters and the excitation parameters are forwarded to a channel coder 20, which produces the bit-stream that is sent over the channel on line 22.

The parameter modification by the parameter modifier 18 can be performed in several ways.

One possible modification is a bandwidth expansion of the filter. This means that the poles of the filter are moved towards the origin of the complex plane. Assume that the original filter H(z)=1/A(z) is given by the expression $$A(z) = 1 + \sum_{m=1}^{M} a_m z^{-m}$$

When the poles are moved with a factor r, $0 \leqq r \leqq 1$, the bandwidth expanded version is defined by A(z/r), or:

$$A\left(\frac{z}{r}\right) = 1 + \sum_{m=1}^{M} (a_m r^m) z^{-m}$$

Another possible modification is low-pass filtering of the filter parameters in the temporal domain. That is, rapid variations of the filter parameters from frame to frame are attenuated by low-pass filtering at least some of said parameters. A special case of this method is averaging of the filter parameters over several frames, for instance 4–5 frames.

The parameter modifier 18 can also use a combination of these two methods, for instance by performing a bandwidth expansion followed by low-pass filtering. It is also possible to start with low-pass filtering and then add the bandwidth expansion.

In the above description, the signal discriminator 24 has been ignored. However, it has been found that it is not sufficient to divide signals into signals representing speech and background sounds, since the background sounds may have different statistical character, as explained above. Thus, the signals representing background sounds are divided into stationary and non-stationary signals in the signal discriminator 24. This process will be further described with reference to FIG. 3. Thus, the output signal on line 26 from the signal discriminator 24 indicates whether the frame to be coded contains stationary background sounds, in which case the parameter modifier 18 performs the above parameter modification, or speech/non-stationary background sounds, in which case no modification is performed.

In the above explanation, it has been assumed that the parameter modification is performed in the encoder of the transmitter. However, it is appreciated that a similar procedure can also be performed in the decoder of the receiver. This is illustrated by the embodiment shown in FIG. 2.

Figure 2:
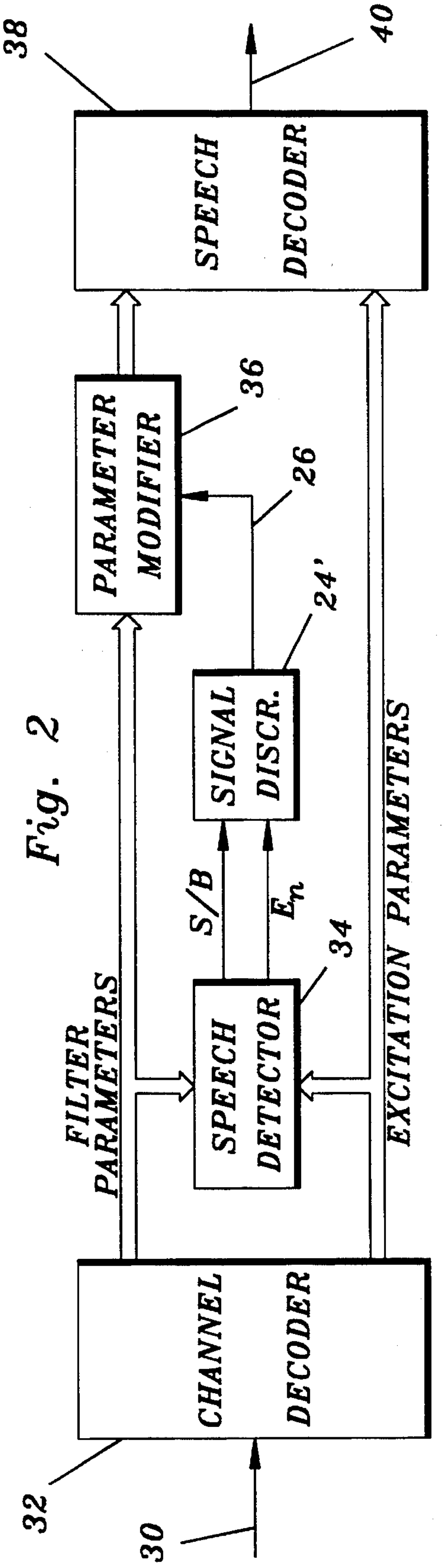
FIG. 2 is a block diagram of a speech decoder provided with means for performing the method in accordance with the present invention.

In FIG. 2 a bit-stream from the channel is received on input line 30. This bit-stream is decoded by a channel decoder 32. The channel decoder 32 outputs filter parameters and excitation parameters. The filter and excitation parameters are forwarded to a speech detector 34, which analyzes these parameters to determine whether the signal that would be reproduced by these parameters contains a speech signal or not. The output signal S/B of the speech detector 34 is over a signal discriminator 24' forwarded to a parameter modifier 36, which also receives the filter parameters.

In accordance with swedish patent application 93 00290-5, if the speech detector 34 has determined that there is no speech signal present in the received signal, the parameter modifier 36 performs a modification similar to the modification performed by the parameter modifier 18 of FIG. 1. If a speech signal is present no modification occurs. The possibly modified filter parameters and the excitation parameters are forwarded to a speech decoder 38, which produces a synthetic output signal on line 40. The speech decoder 38 uses the excitation parameters to generate the above mentioned source signals and the possibly modified filter parameters to define the filter in the source-filter model.

Figure 3:
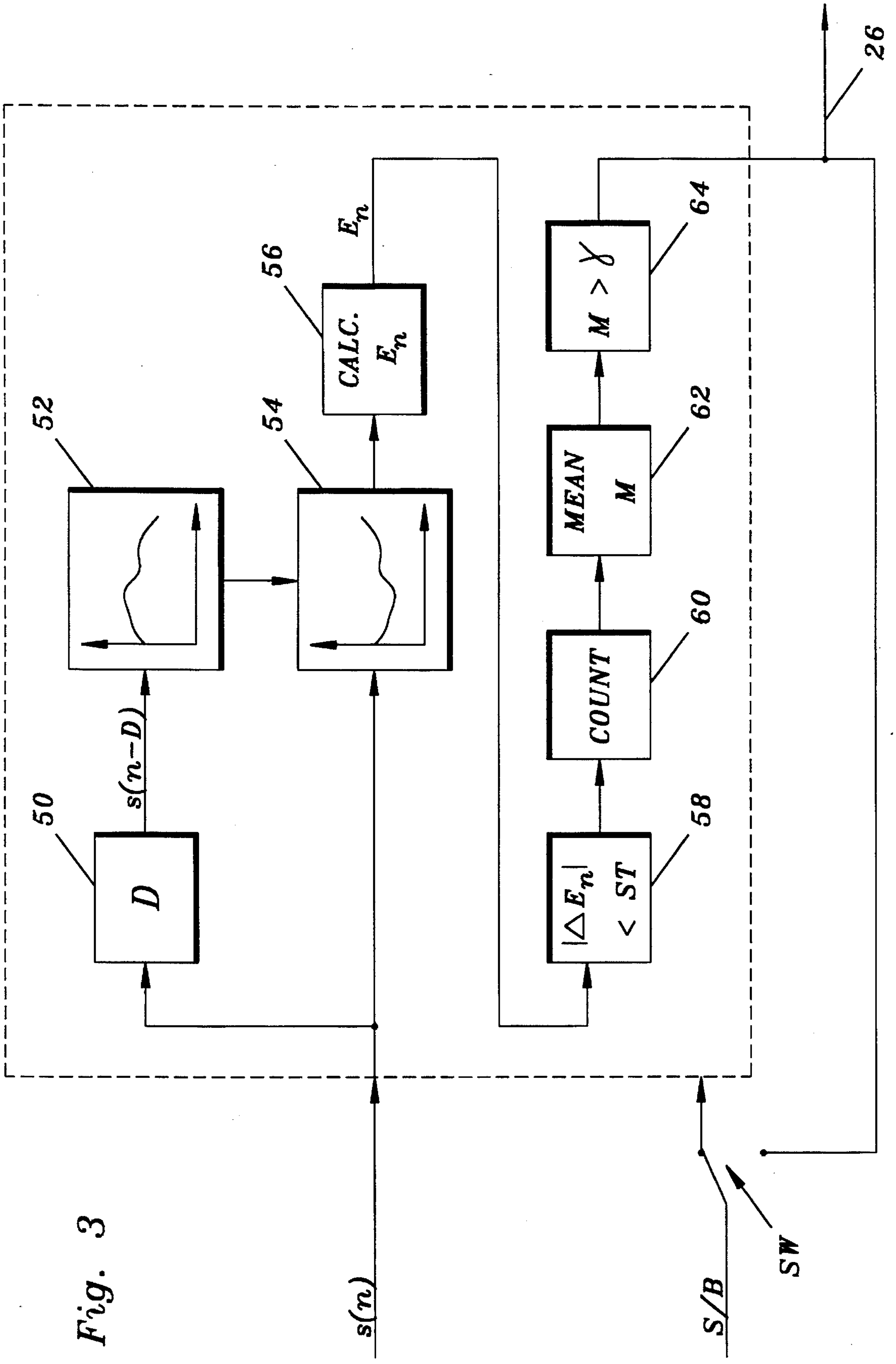
FIG. 3 is a block diagram of a preferred embodiment of an apparatus that operates in accordance with the principles of the present invention.

FIG. 3 shows a block diagram illustrating a preferred embodiment of the signal discriminating process of the present invention. To facilitate the description it is assumed that this process is performed by the discriminator 24 of FIG. 1. Discriminator 24 receives the input signal s(n) and the output signal S/B from the speech detector 16. The signal S/B is forwarded to a switch SW. If speech detector 16 has determined that signal s(n) contains primarily speech, the switch SW will assume the lower position, in which case signal S/B is forwarded directly to the output of the discriminator 24 of FIG. 1.

If the signal s(n) contains primarily background sounds, the switch SW is in its upper position, which activates the discrimination process. The signal s(n) is forwarded to a delay means 50, which delays the signals s(n) D frames, where D in a typical case is 4–5 frames.

The delayed signals reach a spectrum analyzer 52, which determines the spectrum of a signal vector comprising the samples of a predetermined number of signal frames, for example 4–5 signal frames. Thereafter the inverted spectrum is calculated. From this inverted spectrum filter coefficients of an inverse filter are calculated. These coefficients are forwarded to an inverse filter 54. The property of the inverse filter 54 is such that if a signal corresponding to signal s(n–D) is forwarded to its input, its output will be a signal without self correlation, a so called white (noise) signal.

An undelayed signal vector s(n) containing the same number of signal frames as signal vector s(n–D) is forwarded to the inverse filter 54. If this signal has the same spectral distribution as signal s(n–D), the inverse filter 54 will thus output white noise. If the signal s(n) has another spectral distribution a different signal will result from the filter 54.

The output of the filter 54 is forwarded to a means 56 for calculating the energy of its input signal. Preferably the output vector from the inverse filter 54 is normalized with the input vector s(n) to make the energy value $E_n$ independent of the input signal level.

The energy values $E_n$ are forwarded to a (discrete) differentiating circuit 58, in which the magnitude of the difference $\Delta E_n$ between the energy value $E_n$ of the present frame and the energy value $E_{n-1}$ of the previous frame is formed and compared to a fixed threshold ST. If said magnitude exceeds the threshold ST the spectrum of the input signal is changing more rapidly than if the magnitude is below said threshold.

The output from the differentiating circuit 58 is forwarded to a counter 60, which counts the number of consecutive frames in which the magnitude of the difference in energy value is below ST. When ST is exceeded, the counter 60 is sampled and thereafter reset to zero. Thus, the output of the counter 60 indicates how stationary a signal is by counting the number of consecutive frames in which there is a low spectral change. The output of the counter 60 can be characterized as a digital (discrete) saw tooth signal from which only the the top values have been sampled.

However, the output of the counter 60 is not suitable as a measure of stationarity of a signal, since this output is too unstable. Instead, the output of the counter 60 is forwarded to a mean value calculator 62 in which a mean value M of a predetermined number of counts, for example 32, is calculated. This mean value M is forwarded to a comparator 64, in which it is compared to a stationarity limit $\gamma$. If M exceeds $\gamma$ the signal is considered to be stationary. This indicates that the filter parameters should be modified. A suitable value for $\gamma$ has been found to be 8.

If the input signal s(n) is stationary for a very long time, the counter 60 will not be sampled and reset the required number of times (for example 32 as mentioned in the previous paragraph) for forming an average M within a reasonable time. For this reason, the counter 60 may automatically be sampled and reset if it has reached a predetermined maximum count, for example 15.

A feature that makes the preferred embodiment of the invention in accordance with FIG. 3 so attractive is that most of the functions performed by the blocks in FIG. 3 are in fact already performed by the speech or voice activity detector itself. Thus, the voice activity detector in accordance with GSM-recommendation 06.32, ETSI/PT 12 already performs the functions of blocks 50, 52, 54, 56 and 58. Thus, in a preferred embodiment, where the output signals from a speech detector can be reused, the signal discriminator 24 only has to receive the signal S/B and the decisions of an element corresponding to the differentiating circuit 58 in the speech detector 16 in FIG. 1. The discriminator 24 would then comprise only the counter 60, the mean value calculator 62 and the comparator 64.

Another solution would be to use the differentiated energy estimates $\Delta E_n$ directly as an input to the signal discriminators 24, 24'. This has been indicated in FIG. 2. In fact, in FIG. 2 it is necessary to use something else other than the signal s(n) as an input to the signal discriminator 24', since signal s(n) is not available in the receiver. Rather only filter parameters and excitations parameters are available. However, the speech detector 34 produces energy estimates $E_n$ from these parameters instead of signal s(n). This process will now be described with reference to FIG. 4.

Since the actual signal s(n) is not available in the decoder, the autocorrelation coefficients acf(k) are calculated from the reflection coefficients that are part of the parameters transmitted from the encoder in the transmitter. This is done in a calculating means 68. After delaying the calculated autocorrelation coefficients acf(k) D frames in a delay element 70, the power spectrum of the underlying signal s(n) is calculated in an element 72. Thereafter, the filter coefficients of the corresponding inverse filter are calculated in an element 74, which also calculates the quantities $$r(k) = \sum_{i=0}^{K-1} a_i a_{i+1}$$

where $a_i$ are the filter coefficients of said inverse filter and K is the order of this filter. The details of the above calculations are described in for instance GSM recommendation 06.32, which is hereby incorporated by reference.

In GSM recommendation 06.32, it is also shown that the energy values $E_n$ can be calculated in accordance with the formula $$E_n = r(0)acf(0) + 2\sum_{i=1}^{K-1} r(i)acf(i)$$

This calculation is performed in a block 76. Once the energy $E_n$ has been obtained, the remaining blocks 58, 60, 62 and 64 can perform the same functions as in the embodiment of FIG. 3.

Figure 4:
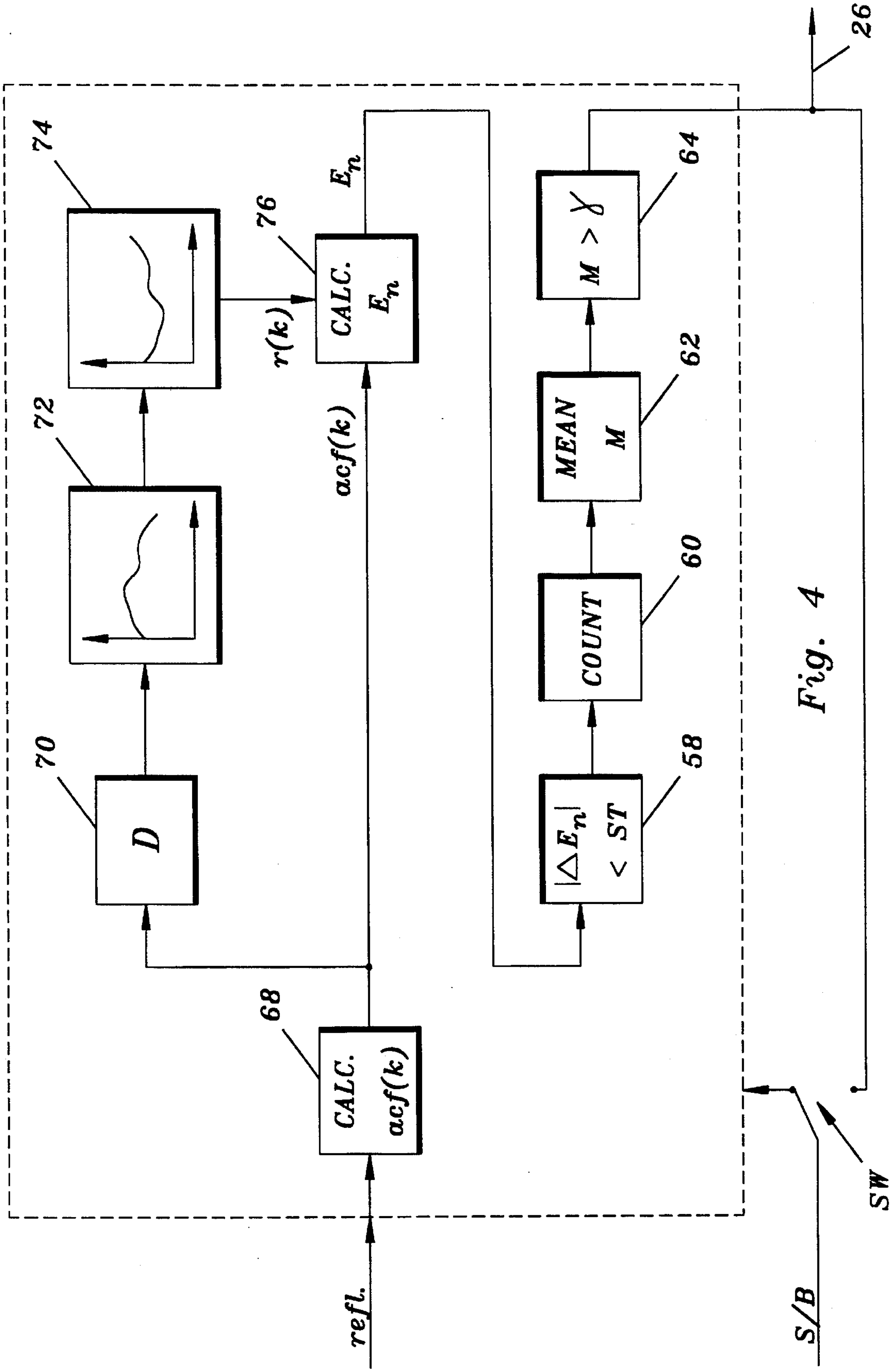
FIG. 4 is a block diagram of another preferred embodiment of an apparatus that operates in accordance with the principles of the present invention, which embodiment is especially suitable in a speech decoder.

Since the autocorrelation coefficients acf(k) are also calculated in the encoder of the transmitter, it is appreciated that an embodiment similar to the embodiment of FIG. 4 can also be used in the encoder.

In order to save further memory, a leaky integrator filter can be used instead of the mean value calculator 62. Such a filter also smooths the output signal to the comparator 64.

In the above description the sampled output from the counter 60 was used to form a mean value for a stationarity decision. However, it is also possible to integrate $|\Delta E_n|$ directly to form a test variable for comparison with $\gamma$.

In some situations when it has been determined that a certain frame contains non-stationary background sounds, it is preferable to slightly raise the stationarity limit $\gamma$ to prevent decisions for later frames from switching back and forth between "stationary" and "non-stationar". Thus, if a non-stationary frame has been found it will be easier for the following frames to be classified as non-stationary as well. When a stationary frame eventually is found the stationarity limit $\gamma$ is lowered again. This technique is called "hysteresis".

Another preferable technique is "hangover". Hangover means that a certain decision by the signal discriminator 24 has to persist for at least a certain number of frames, for example 5 frames, to become final. Preferably "hysteresis" and "hangover" may be combined.

For further details on the process in accordance with the present invention the Pascal program in the APPENDIX can be consulted.

It will be understood by those skilled in the art that various modifications and changes may be made to the present invention without departure from the spirit and scope thereof, which is defined by the appended claims.

APPENDIX

```
{ Wherever possible variable and constant names are similar to
names used in GSM recomendation 06.32 }

PROCEDURE    FLspectralComparison2 (
            ZFLav0       : realAcfOldtype;            { In     }
            ZFLav1       : REALACFVECTORTYPE;         { In     }
            ZFLthresh    : Real;                      { In     }
        VAR ZFLlastDm    : Real;                      { In/Out }
        VAR Zstat        : Boolean);                  { Out    }

VAR
    i                                    : Integer;
    difference, dm                       : Real;

BEGIN
    IF ZFLav0[0,0] <= 0 THEN BEGIN
        dm :=0;
    END ELSE BEGIN
        dm := ZFLrav1[0]*ZFLav0[0,0];
        FOR i := 1 TO nrOfAcflagsUsed DO
            dm := dm + 2.0*ZFLrav1[i]*ZFLav0[0,i];
        dm := dm/AFLav0[0,0];
    END;
    difference := dm - ZFLlastDm;
    Zstat := ABS(difference) < ZFLthresh;
    ZFLlastDm := dm;
END;

PROCEDURE    FLvadThresh(
            ZFLacf          : realAcfVectorType;       { In     }
            ZFLrav1         : REALACFVECTORTYPE;       { In     }
            Zstat           : Boolean;                 { In     }
            Zptch           : Boolean;                 { In     }
            ZFLpvad         : Double;                  { In     }
        VAR ZFLstatCount    : Integer;                 { In/Out }
        VAR ZFLadaptCount   : Integer;                 { In/Out }
        VAR ZFLthvad        : Double;                  { In/Out }
        VAR ZFLrvad         : REALACFVECTORTYPE);      { In/Out }

VAR
    i                                    : Integer;

CONST
    pth                                  = 300000;
    plev                                 = 800000;
    fac                                  = 3;
    adp                                  = 8;
    inc                                  = 16;
    dec                                  = 32;
    margin                               = 800000000;

BEGIN
        IF NOT (Zstat AND NOT Zptch) THEN BEGIN
            ZFLadaptcount := 0;
            ZFLstatCount := 0;
        END ELSE BEGIN
            ZFLadaptcount := ZFLadaptcount + 1;
            ZFLstatCount := ZFLstatCount + 1;

            IF FLadaptcount > adp THEN BEGIN

                ZFLthvad := ZFLthvad - ZFLthvad/dec;

                IF ZFLthvad < ZFLpvad*fac THEN
                    ZFLthvad := MIN(ZFLthvad + ZFLthvad/inc,
ZFLpvad*fac);

                FOR i := 0 TO nrOfAcflagsUsed DO
                    ZFLrvad[i] := ZFLrav1[i];

                IF ZFLadaptCount > 100 THEN
                    ZFLadaptCount:= 100;

                IF ZFLstatCount > 15 THEN
                    ZFLstatCount:= 0;

                IF ZFLthVad < 245760 THEN
```

APPENDIX-continued

```
                ZFLthvad := 245760;

            END;
        END;
END;

PROCEDURE    FLstatDet(
                    ZFLsp            : Boolean;        { In     }
                    ZFLadaptCount    : Integer;        { In     }
                    ZFLminThresh     : Real;           { In     }
                    ZFLmaxThresh     : Real;           { In     }
                VAR ZFLoldAdapt      : Integer;        { In/Out }
                VAR ZFLstatCount     : Integer;        { In/Out }
                VAR ZFLcountFilter   : Real;           { In/Out }
                VAR ZFLprelNoStat    : Boolean);       { In/Out }

VAR
    i                                : Integer;
    oldNoStat                        : Boolean;

BEGIN
    oldNoStat := ZFLprelNoStat;
    ZFLprelNoStat := ZFLsp;

    IF NOT ZFLsp THEN BEGIN
        IF ( ZFLstatCount = 0 ) AND ( ZFLoldAdapt > 0 ) THEN BEGIN

            ZFLcountFilter := 0.95*ZFLcountFilter + ZFLoldAdapt;

        END;
        IF ZFLcountFilter < ZFLmaxThresh THEN
            ZFLprelNoStat := oldNoStat;

        IF ZFLcountFilter < ZFLminThresh THEN
            ZFLprelNoStat := True;

    END;
    ZFLoldAdapt := ZFLadaptCount;
END;
```

I claim:

1. A method of discriminating between stationary and non-stationary frames containing signals representing background sounds in a mobile radio communication system, comprising the steps of:

(a) forming a set of first consecutive measures representing spectral changes in said signals from frame to frame;

(b) forming a second measure of the rate of spectral change of said signals from said first measures; and (c) determining whether said second measure exceeds a predetermined stationarity limit $\gamma$.

2. The method of claim 1, wherein the step of forming each of said first measures includes the steps:

(a1) determining the spectrum of a first signal vector containing samples from a first time window of consecutive signal frames;

(a2) determining coefficients of an inverse filter representing the inversion of the spectrum obtained in step (a1).

3. The method of claim 2, wherein the step of forming each of said first measures includes the further steps:

(a3) feeding a second signal vector containing samples from a second time window of consecutive signal frames through said inverse filter, said second time window having a predetermined time displacement relative to and the same number of frames as said first time window;

(a4) determining an energy value of the output signal vector from said inverse filter.

4. The method of claim 3, comprising the further step of (a5) forming the magnitude of the difference between consecutive energy values to represent said first measure.

5. The method of claim 4, comprising the further steps of (b1) determining the number of consecutive first measures obtained in step (a5) that do not exceed a predetermined threshold value;

(b2) repeating step (b1) a predetermined number of times;

(b3) forming the mean value of the numbers obtained in step (b1) and (b2) to represent said second measure.

6. The method of claim 2, wherein the step of forming each of said first measures includes the further steps:

(a3) forming the autocorrelation coefficients of a second signal vector containing samples from a second time window of consecutive signal frames, said second time window having a predetermined time displacement relative to and the same number of frames as said first time window;

(a4) forming an energy value in accordance with the formula $$E_n = r(0)acf(0) + 2\sum_{i=1}^{K-1} r(i)acf(i)$$

where acf(i) are said autocorrelation coefficients, K is the number of filter coefficients of said inverse filter, and $$r(i) = \sum_{j=0}^{K-1} a_j a_{j+1}$$

where a(j) are the coefficients of the inverse filter.

7. An apparatus for discriminating between stationary and non-stationary frames containing signals representing background sounds in a mobile radio communication system, said apparatus comprising:

(a) means for forming a set of first consecutive measures representing spectral changes in said signals from frame to frame;

(b) means for forming a second measure of the rate of spectral change of said signals from said first measures; and (c) means for determining whether said second measure exceeds a predetermined stationarity limit $\gamma$.

8. The apparatus of claim 7, wherein said means for forming said first measures includes:

means for determining the spectrum of a first signal vector containing samples from a first time window of consecutive signal frames;

means for determining coefficients of an inverse filter representing the inversion of said spectrum.

9. The apparatus of claim 8, wherein said means for forming said first measures also includes:

input means to said inverse filter for feeding a second signal vector containing samples from a second time window of consecutive signal frames through said inverse filter, said second time window having a predetermined time displacement relative to and the same number of frames as said first time window;

means for determining an energy value of the output signal vector from said inverse filter.

10. The apparatus of claim 8, wherein said means for forming said first measures also includes:

means for forming the autocorrelation coefficients of a second signal vector containing samples from a second time window of consecutive signal frames, said second time window having a predetermined time displacement relative to and the same number of frames as said first time window;

means for forming an energy value in accordance with the formula $$E_n = r(0)acf(0) + 2\sum_{i=1}^{K-1} r(i)acf(i)$$

where acf(i) are the autocorrelation coefficients, K is the number of filter coefficients of the inverse filter, and $$r(i) = \sum_{j=0}^{K-1} a_j a_{j+1}$$

where a(j) are the coefficients of the inverse filter.

11. The apparatus of claim 9, wherein said means for forming said first measures also includes means for forming the magnitude of the difference between consecutive energy values to represent said first measure.

12. The apparatus of claim 11, further comprising counting means for counting the number of consecutive first measures obtained from said magnitude forming means that do not exceed a predetermined threshold value;

means for sampling and resetting said counting means each time said predetermined threshold value has been exceeded;

means for forming the mean value of the numbers obtained from said counting means to represent said second measure.

* * * * *